United States Patent [19]

Commins

[11] Patent Number: 5,555,694
[45] Date of Patent: Sep. 17, 1996

[54] STRUCTURAL HANGER

[75] Inventor: Alfred D. Commins, Danville, Calif.

[73] Assignee: Simpson Strong-Tie Company, Inc., San Leandro, Calif.

[21] Appl. No.: 379,277

[22] Filed: Jan. 27, 1995

[51] Int. Cl.$^6$ .................................................. E04B 1/38
[52] U.S. Cl. .......................... 52/702; 52/713; 248/300; 403/232.1; 403/237; 403/353
[58] Field of Search .......................... 52/702, 712, 713, 52/92.2, 92.1, 92.3, 289; 403/232.1, 234, 237, 230, 353; 248/300

[56] References Cited

U.S. PATENT DOCUMENTS

| | | |
|---|---|---|
| 755,116 | 3/1904 | Dreyer . |
| 804,451 | 11/1905 | Carlson . |
| 924,842 | 6/1909 | Seipp . |
| 1,097,934 | 5/1914 | Price ............................................ 52/702 |
| 3,000,145 | 9/1961 | Fine ............................................ 50/466 |
| 3,422,585 | 1/1969 | Dismukes .................................. 52/713 |

FOREIGN PATENT DOCUMENTS

| | | |
|---|---|---|
| 0210744 | 2/1987 | European Pat. Off. . |
| 2047320 | 11/1980 | United Kingdom ...................... 52/702 |
| 2062058 | 5/1981 | United Kingdom ...................... 52/702 |
| 2156398 | 10/1985 | United Kingdom . |
| 2163788 | 3/1986 | United Kingdom ...................... 52/702 |
| 2176222 | 12/1986 | United Kingdom . |

*Primary Examiner*—Michael Safavi
*Attorney, Agent, or Firm*—James R. Cypher

[57] ABSTRACT

A structural hanger connection including a supporting structure having a top surface and a front face; a supported structure disposed at an angle to the front face of the supporting structure and a structural hanger including a top flange element adapted for resting on the top surface of the supporting structure and formed with two pairs of slots formed therein, and a stirrup element formed with ends respectively woven through the slots and forming a connection with the top flange element and including a seat member and a pair of laterally spaced side members connected to the seat member and engaging the supported structure.

11 Claims, 6 Drawing Sheets

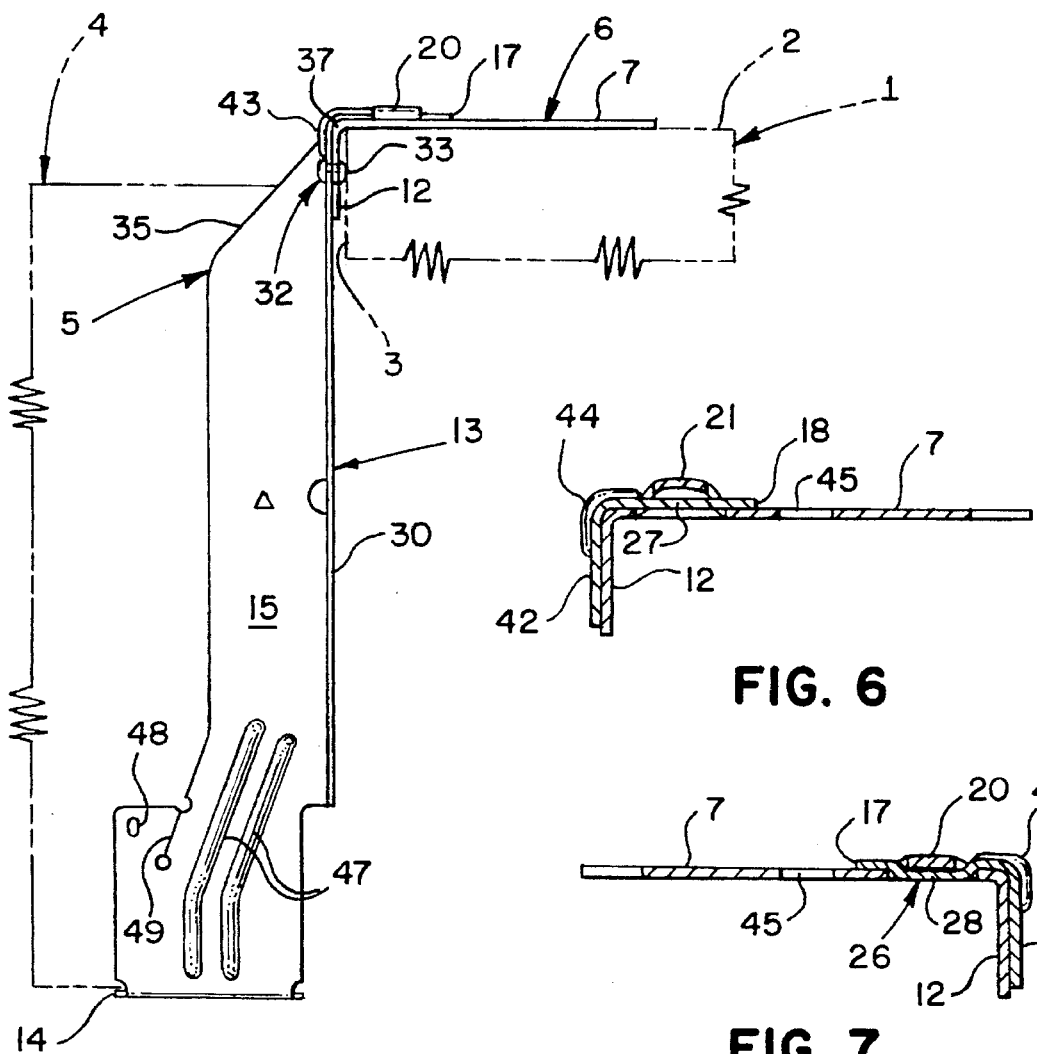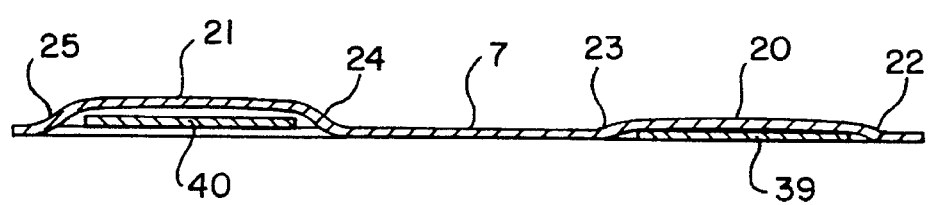

5,555,694

STRUCTURAL HANGER

BACKGROUND OF THE INVENTION

This invention relates to a structural hanger for attaching a supported wood structure to a wood, masonry or steel supporting structure.

In wood frame buildings, a common problem is the attachment of horizontal wood members to either vertical masonry walls or headers which are either wood or steel beams. Since the horizontal wood members come in many widths and heights, if a single piece metal hanger is used, it requires the manufacturer to make a great number of different hangers and for the distribution chain to stock all of these different size hangers. Further, the hanger should have different size top flange elements depending upon whether the hanger is bearing upon wood, steel or masonry surfaces.

One solution which is presently being used is to manufacture the hanger from two pieces; viz., a top flange element and a stirrup element. The manufacturer then joins the two elements by welding and usually paints the completed hanger to guard against rusting. This is an expensive and labor intensive process.

As a specific example, a standard top flange hanger as described in U.S. Pat. No. 4,005,942 is formed of two pieces; a U-shaped stirrup welded to an L-shaped top flange. The problem with the '942 hanger is the fact that there are hundreds of combinations of seat widths, stirrup heights, stirrup thickness, top flange widths, and top flange thickness. It is impractical for the distributor and even the manufacturer to stock all of the different combinations of hangers shown in U.S. Pat. No. 4,005,942 in assembled form. As a practical matter, only a few common sizes are stocked, and all of the other orders are made up from pre-made top flange elements and stirrup elements, welded, painted and then shipped to the customer. This process results in costly delays and lost business.

SUMMARY OF THE INVENTION

The gist of the invention is to configure the flange of the top flange element with a pair of slots. Thus when an order is received, the correct size stirrup elements and the correct size top flange elements are selected from inventory. It is then a simple matter to weave the ends of the side members of the stirrup element through the slots. After the ends are woven through the slots, the strips between the slots are crimped downwardly so that the portions adjacent the ends form a compound curve such as a hat shape so that there is a "woven" interlock between the stirrup element and the top flange element.

As an added feature to obtain more holding power, rivets may be inserted through the stirrup element into the top flange element such as the depending flange of the top flange element.

An object of the invention is to manufacture a structural hanger in which the components of the hanger can be pre-manufactured in a variety of sizes and then assembled quickly and efficiently at either the manufacturing plant or a distribution center.

A further object is to eliminate welding and painting in the manufacture and assembly of the completed hanger.

A still further object is to utilize a stirrup element which is commonly used in other hangers thus eliminating the need for special dies and forming equipment and to realize the economies of being able to use a standard stirrup element.

Still another object is to take advantage of the fact that the same size top flange element may be used with a number of stirrup elements.

BRIEF DESCRIPTION OF THE DRAWINGS

FIG. 5 is a side view of the hanger illustrated in FIG. 4 taken in the direction of line 5—5.

FIG. 6 is an enlarged scale cross section of a portion of the hanger taken along line 6—6 in FIG. 3 showing the stirrup portion prior to crimping.

FIG. 7 is an enlarged scale cross section of a portion of the hanger taken along line 7—7 showing the stirrup portion after crimping.

FIG. 8 is an enlarged scale cross section of a portion of the hanger taken along line 8—8 with the left side showing the stirrup prior to crimping, and the right side showing the stirrup after crimping.

DESCRIPTION OF THE INVENTION

Figure 1:
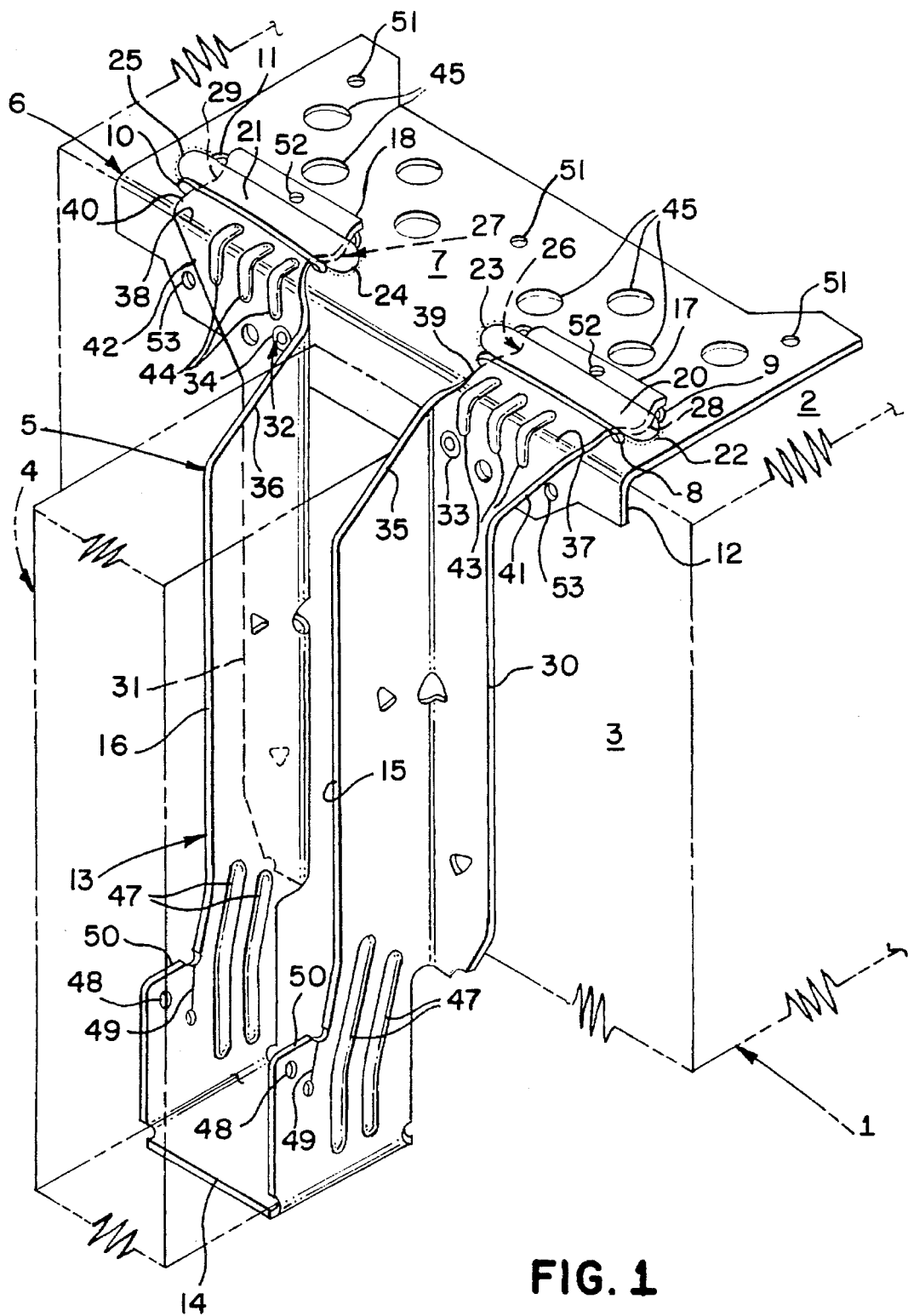
FIG. 1 is a perspective of the structural hanger of the present invention mounted on a supporting structure shown in broken lines, and holding a supported structure such as a wood I-beam in broken lines.

The structural hanger connection of the present invention consists of: a supporting structure 1 having a top surface 2 and a front face 3; a supported structure 4 disposed at an angle to the front face 3 of the supporting structure 1; and a structural hanger 5 including; a top flange element 6 adapted for resting on the top surface 2 of the supporting structure 1 and formed with two pairs of slots 8, 9, 10, and 11 formed therein; a stirrup element 13 formed with ends 17 and 18 respectively woven through the slots 8, 9, 10, and 11 and forming a connection with the top flange element 6 and including a seat member 14 and a pair of laterally spaced side members 15 and 16 connected to the seat member 14.

Top flange element 6 is preferably formed with a top surface flange 7 adapted for resting on the top surface 2 of the supporting structure 1 and two pairs of slots 8–11 are formed therein. Preferably each of the pairs of slots 8–11 are spaced apart forming strip members 20 and 21 attached at their ends 22–25 to the top flange element 7; and a portion 26, 27 of the ends 17, 18 of the stirrup element 13 are formed in a compound curve such as a hat shape 28, 29 as they pass through the first 8, 10 of the slots, extend beneath the respective strip members 20, 21 and emerge through the second 9, 11 of the slots.

In a preferred form of the invention, first and second face flanges 30, 31 are connected to the side members 15, 16 of the stirrup element 13 and are adapted for close alignment with the front face 3 of the supporting structure 1. Preferably, the portions 26, 27 of the ends 17, 18 of the stirrup element 13 are connected to the face flanges 30, 31 of the stirrup element 13.

As illustrated in the drawings, a depending flange 12 may be angularly connected to the top surface flange 7 of the top flange element 6; and a means 32 on the stirrup element 13 may be used for mechanically interlocking with the top flange element 6. Preferably the means 31 on the stirrup element 13 mechanically interlocks with the depending flange 12 of the top flange element 6. As shown in FIG. 1, the means 32 on the stirrup element 13 may be attached to the first and second face flanges 30, 31 of the stirrup element 13.

While many various types of fasteners may be used, the preferable means 32 on the stirrup element 13 is a rivet or preferably a pair of rivets 33, 34.

No particular length is required, but to give maximum lateral support, the side members 15, 16 of the stirrup element 13 may extend to positions 35, 36 adjacent the top surface flange 7 of the top flange element 6.

Figure 9:
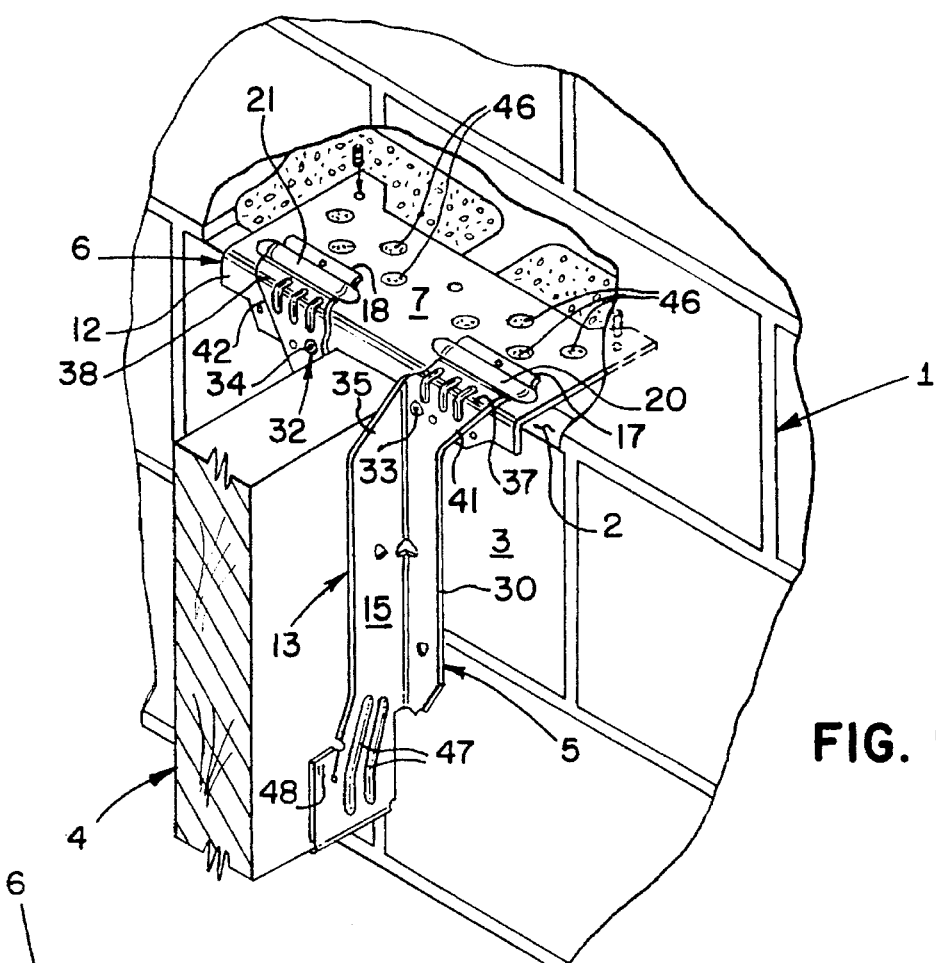
FIG. 9 is a perspective of the hanger of the present invention installed in a masonry wall with portions of the wall cut away for clarification. The hanger is illustrated supporting a sawn wood beam or composite I-beam.
Figure 10:
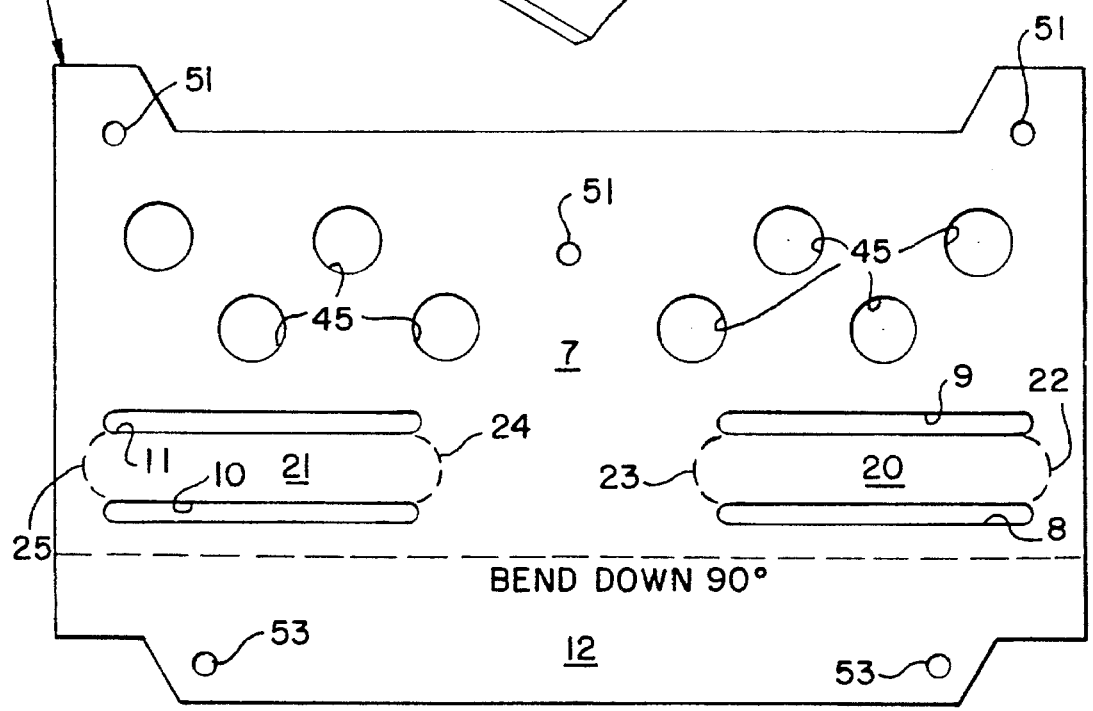
FIG. 10 is a plan view of a top flange element prior to bending.
Figure 11:
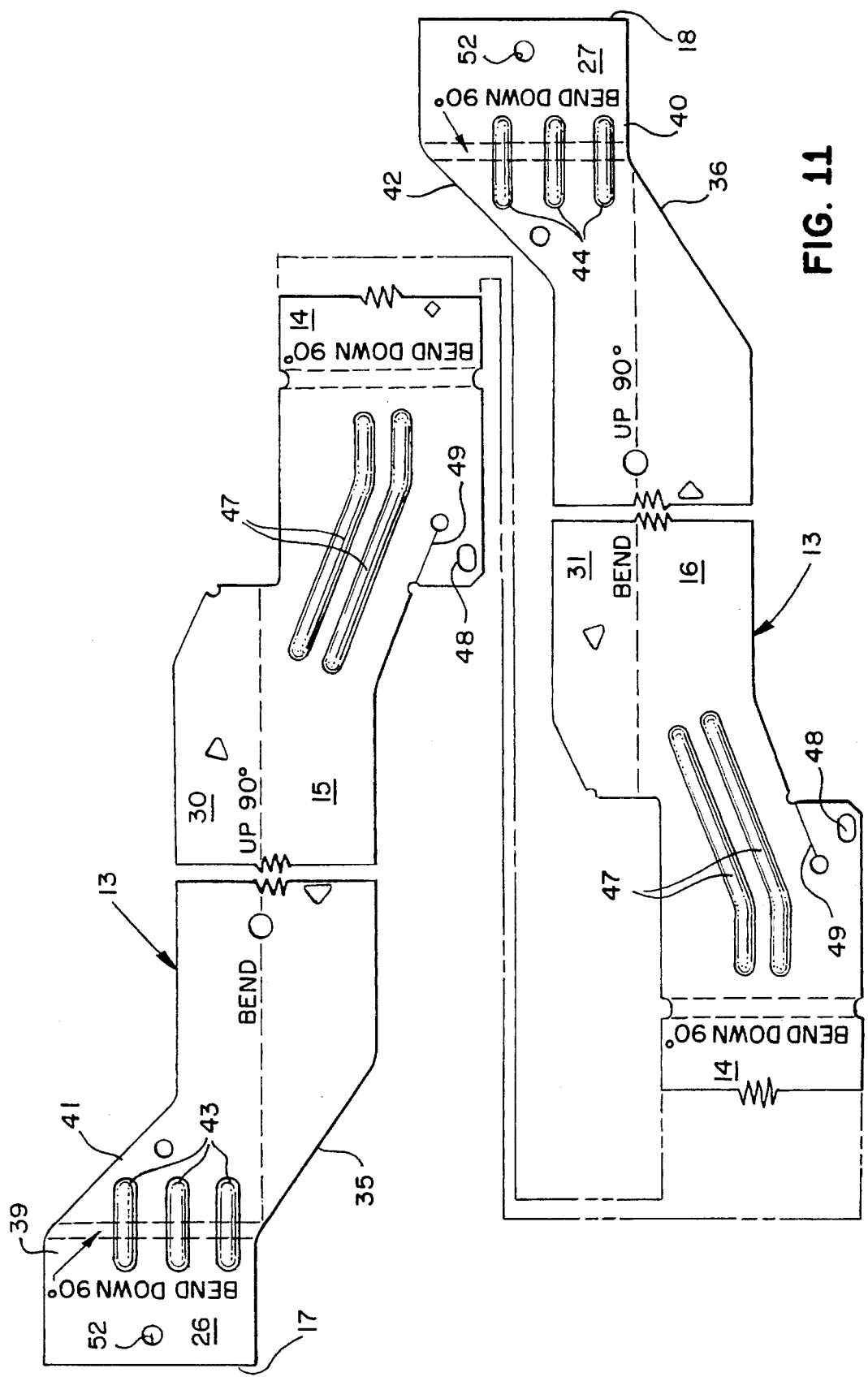
FIG. 11 is a plan view of a stirrup element of the present invention on an enlarged scale prior to bending. Portions of the stirrup element have been removed and the stirrup element has been cut and rearranged so that it will fit on the paper.

In order to enhance the rigidity of the structural hanger connection, the first and second face flanges 30, 31 of the stirrup element 13 may be formed with a generally right angular bend 37, 38 at the intersection of the portion 39, 40 adapted for engaging the top surface flange 7 of the top flange element 6 and the portions 41, 42 engaging the depending flange 12 of the top flange element 6; and embossments 43, 44 are formed in the right angular bend portions 37, 38 of the stirrup element 13.

Where the structural hanger connection as described is to be used in a masonry wall as illustrated in FIG. 9, the top surface flange 7 is preferably formed with perforations 45 adapted to receive and interlock with grout material 46.

As stated above, one of the advantages of the present invention is the fact that the stirrup element 13 is adapted from a standard product so that the costs of the dies and equipment used in making the stirrup element may be amortized over several products. The stirrup element is formed with embossments in the side members 15 and 16 adjacent seat 14 for stiffening the stirrup element 13. Slant nail openings 48 are provided in the side members 15 and 16 for driving fasteners into the supported structure 4 which may be either a sawn wood member or a composite I-beam with top and bottom chords and a web member (not shown).

Where an I-beam is used, slits 49 are formed in the side members 15 and 16 so that portions 50 of the side members 15 and 16 including slant nail openings 48 may be bent over and engage the bottom chord of the I-beam (not shown).

Stirrup elements 13 may be made in a variety of sizes. Approximately 38 different size stirrup elements are initially planned and more will become available. Seat widths of 1 9/16", 1 11/16", 1 13/16", 2 9/16", 1 11/16 ", and 3 9/16" are initially planned and thirteen stirrup heights ranging from approximately 7 13/16", to 26" are available. The stirrup elements may be provided in different gauges such as 16 gauge steel and 18 gauge steel.

Top flange elements 6 may be provided in a number of different sizes. Initially 7 different flange elements are to be made. Example depths are 3 7/16" and widths vary from 7.375" to 8.375". Gauge may vary, but 12 Gauge galvanized steel is representative. Slots 8–11, for example may have a length of 2.1250 inches.

The above dimensions are given to illustrate the great number of combinations that can result from starting with 38 different stirrup elements 13 and 7 different top flange elements 6. Initially, 46 different combinations are planned for the market.

As previously stated, the great advantage of the present invention is that different size stirrup elements 13 and different size top flange elements 6 can be premanufactured and stocked. When an order is received, the components can be quickly assembled and then joined as set forth below.

Figure 2:
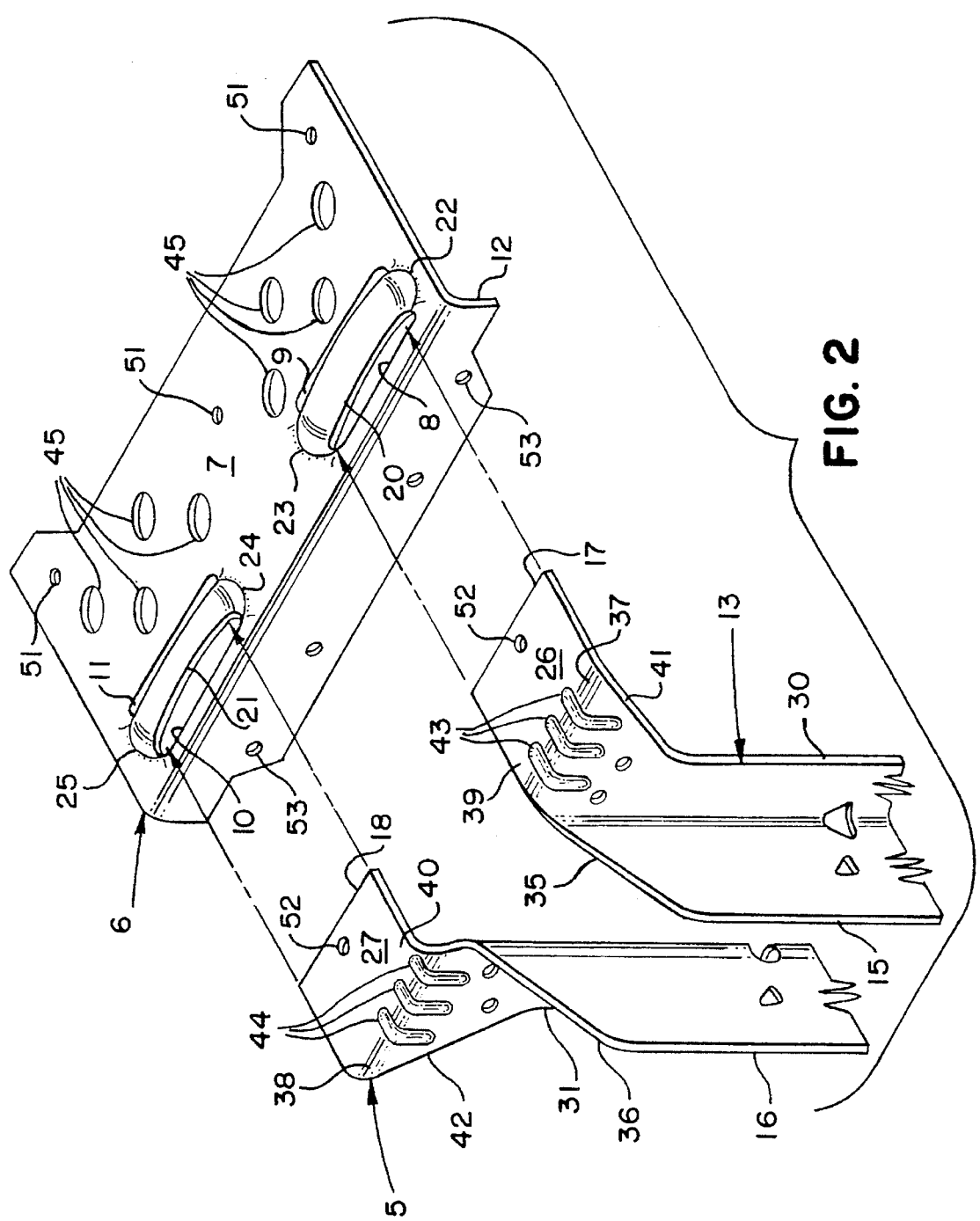
FIG. 2 is an exploded perspective of a portion of the hanger illustrated in FIG. 1 for illustrating the mating of the top flange and stirrup elements by a weaving method.
Figure 3:
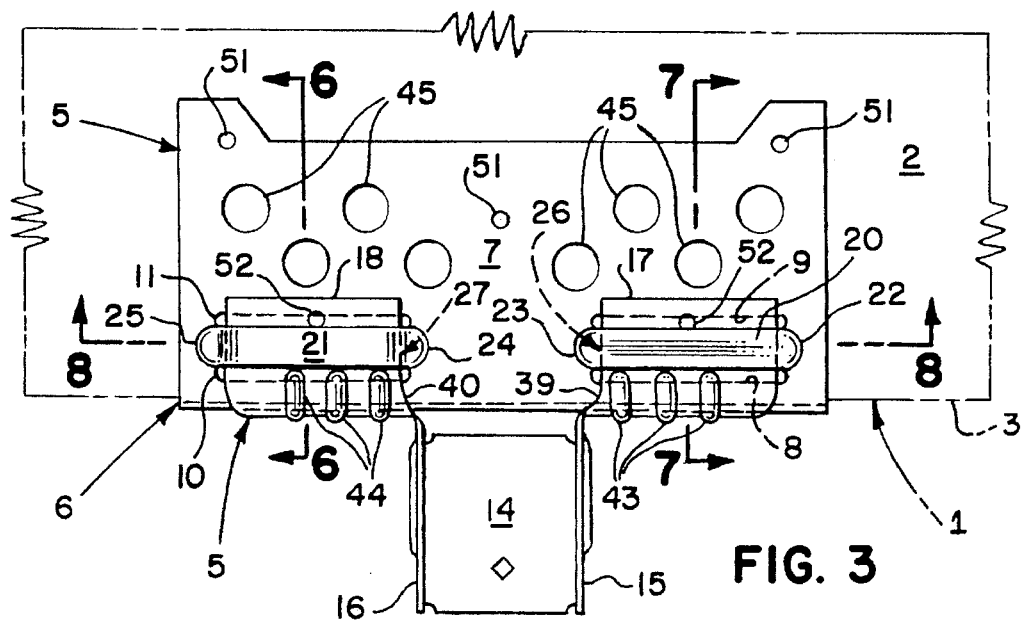
FIG. 3 is a top view of the hanger illustrated in FIG. 1 illustrating the supporting structure in broken line.
Figure 4:
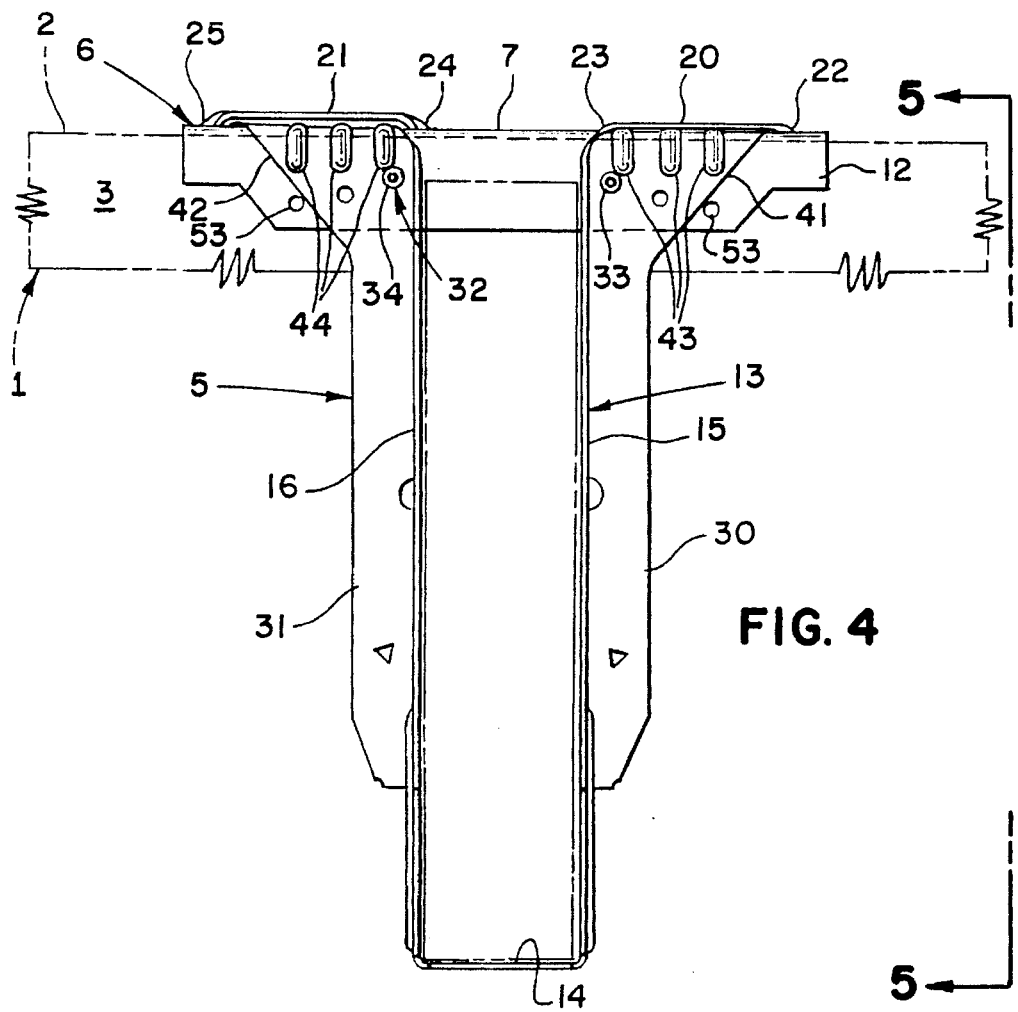
FIG. 4 is a front elevation view of the hanger illustrated in FIG. 3 with the supporting structure in broken line.

Referring to FIGS. 2, 6, and 8 strip members 20 and 21 in top flange element 6 are initially manufactured in a raised position as shown, so that ends 17 and 18 of the stirrup element may be slid beneath the raised strip members 20 and 21. When portions 41 and 42 of stirrup element 13 are in registration with depending flange 12 of top flange element 6, strip members 20 and 21 are forced downwardly thus placing U-shaped crimps 28 and 29 in portions 26 and 27 of ends of stirrup element 13 as illustrated in FIGS. 1, 7, and 8.

Early tests indicated the following example joist size and allowable loads. For the ITTM9.5 and a joist size of 45 mm×241 mm (1.775"×9.5") installed on nominal 2.8 KN masonry, the deflection limit of 1.5 mm was reached at 1,093 lbs, and failure load at deflection of 15 mm at 2,642 lbs. was reached at 2,642 lbs. An allowable load with a safety factor of 3 was calculated at 3.92 kN or 880 lbs.

In another example an ITTM414 with a joist size of 89 mm×356 mm (3.5"×14.0") was installed on nominal 2.8 KN masonry and tested. Deflection limit of 1.5 mm was reached at 832 lbs., failure load at 15 mm deflection was 3,455 lbs and an allowable load with a safety factor of 3 was calculated at 5.12 kN or 1,152 lbs.

As an example, a fastener 33 such as a National Rivet RA45854 is used and may be installed with a Model 1200 rivet machine from National Rivet & Manufacturing Co.

Supporting structure 1 may be a wood beam member, a steel beam member, or a masonry or concrete wall.

When the supporting structure 1 is a wood member, it may be desirable to form fastener openings 51 in top surface flange 7 of the top flange element 6 through which nails or screws may be driven into the supporting structure 1. Further, fastener openings 52 may be formed in the stirrup element 13 adjacent ends 17 and 18 for driving a nail or screw therethrough into supporting structure 1. Finally, fastener openings 53 may be formed in depending flange 12 of top flange element 6 for driving nails or screws therethrough into front face 3 of the supporting structure 1.

I claim:

1. A structural hanger connection comprising:
   a. a supporting structure having a top surface and a front face;
   b. a supported structure disposed at an angle to said front face of said supporting structure;
   c. a structural hanger including;
      1) a top flange element resting on said top surface of said supporting structure and formed with two pairs of first and second slots formed therein; and
      2) a stirrup element formed with ends respectively woven through said slots and forming a connection with said top flange element and including a seat member and a pair of laterally spaced side members connected to said seat member engaging said supported structure;

d. said top flange element having a top surface flange resting on said top surface of said supporting structure wherein said two pairs of slots are formed therein;

e. each of said pairs of slots are spaced apart forming strip members attached at their ends to said top flange element; and f. a portion of said ends of said stirrup element are formed in a compound curve after they pass through said first of said slots, extend beneath said respective strip members and emerge through said second of said slots.

2. A structural hanger connection as described in claim 1 comprising:

a. first and second face flanges connected to said side members of said stirrup element in close alignment with said front face of said supporting structure.

3. A structural hanger connection as described in claim 2 comprising:

a. said portions of said ends of said stirrup element are connected to said face flanges of said stirrup element.

4. A structural hanger connection as described in claim 3 comprising:

a. a depending flange angularly connected to said top surface flange of said top flange element.

5. A structural hanger connection as described in claim 4 comprising:

a. means on said stirrup element mechanically interlocking with said top flange element.

6. A structural hanger connection as described in claim 5 comprising:

a. said means on said stirrup element mechanically interlocks with said depending flange of said top flange element.

7. A structural hanger connection as described in claim 6 comprising:

a. said means on said stirrup element is attached to said first and second face flanges of said stirrup element.

8. A structural hanger connection as described in claim 7 comprising:

a. said means on said stirrup element is a rivet.

9. A structural hanger connection as described in claim 8 comprising:

a. said side members of said stirrup element extend to a position adjacent said top surface flange of said top flange element.

10. A structural hanger connection as described in claim 9 comprising:

a. said first and second face flanges of said stirrup element are formed with a generally right angular bend at the intersection of the portion adapted for engaging the top surface flange of said top flange element and the portions engaging said depending flange of said top flange element; and b. embossments are formed in said right angular bend portions of said stirrup element.

11. A structural hanger connection as described in claim 10 comprising:

a. said top surface flange is formed with perforations adapted to receive and interlock with grout material.

\* \* \* \* \*